L. A. HAWTHORNE.
MEASURING INSTRUMENT.
APPLICATION FILED APR. 16, 1914.

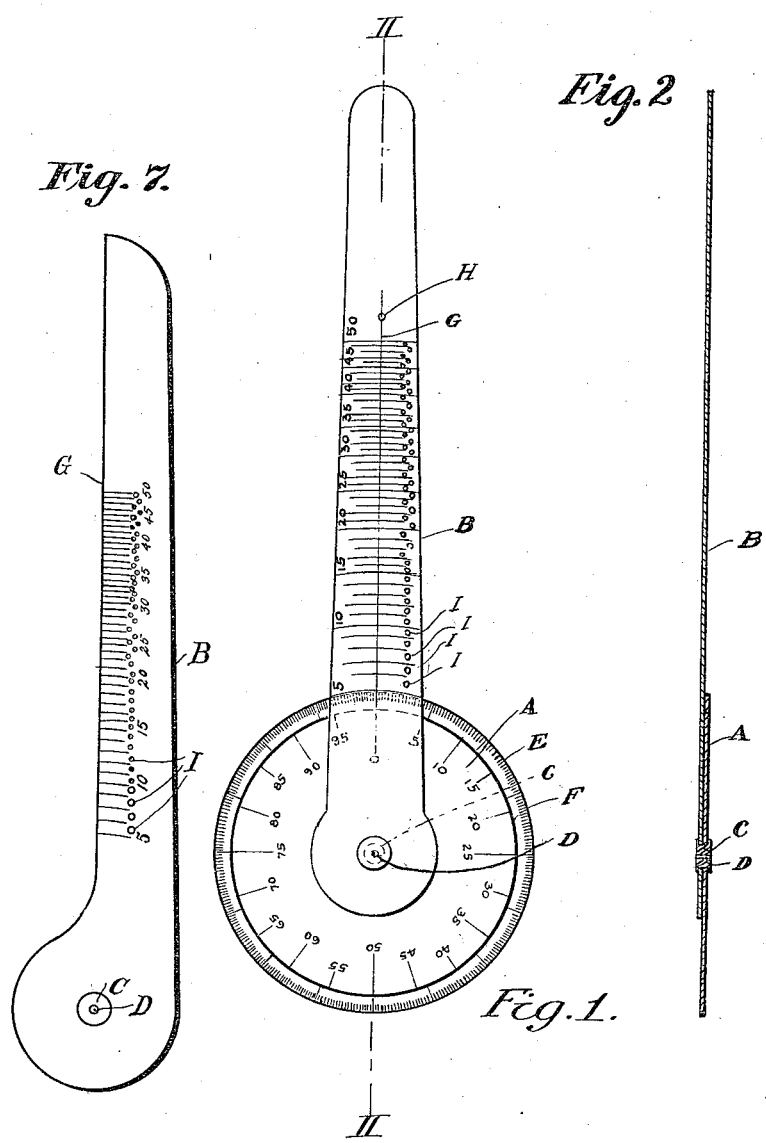

1,142,423.

Patented June 8, 1915.
3 SHEETS—SHEET 2.

WITNESSES:
John J. Swinbank
H. F. Flohn

INVENTOR
Louis A. Hawthorne
BY
Linthicum, Belt & Fuller
his ATTORNEYS

L. A. HAWTHORNE.
MEASURING INSTRUMENT.
APPLICATION FILED APR. 16, 1914.

1,142,423.

Patented June 8, 1915.
3 SHEETS—SHEET 3.

WITNESSES:

INVENTOR
Louis A. Hawthorne
BY
his ATTORNEYS

UNITED STATES PATENT OFFICE.

LOUIS A. HAWTHORNE, OF NEWARK, NEW JERSEY.

MEASURING INSTRUMENT.

1,142,423.

Specification of Letters Patent.

Patented June 8, 1915.

Application filed April 16, 1914. Serial No. 832,257.

*To all whom it may concern:*

Be it known that I, LOUIS A. HAWTHORNE, a citizen of the United States, residing at Newark, in the county of Essex and State of New Jersey, have invented a new and useful Measuring Instrument, of which the following is a specification.

My invention relates to the construction of instruments used in measuring the area of plotted plane figures, and for indicating angles, and the invention more particularly relates to the construction of an improved planimeter having novel means whereby the area of plotted plane figures of either regular or irregular outline and of any size, is quickly and accurately determined.

Planimeters as heretofore constructed are provided with a graduated rotatable measuring wheel and with a tracing arm having a pointer or index finger which is caused to trace the plotted outline of the figure of which the area is being determined. Such instruments of precision are very delicate and their manufacture involves a degree of workmanship and skill such as to make such planimeters very expensive, while great care must be exercised in the use of such instruments in order to obtain accurate results. A prepared surface over which the traveling measuring wheel moves also must be provided, so that frequently the plane figure being measured must be plotted upon a larger sheet of paper or on an enlarged scale, in order to provide the track or space necessary to accommodate the measuring wheel.

One object of my invention is to provide a planimeter of improved construction having novel means by which the plotted area of a plane figure of any outline is easily and quickly determined.

Another object of the invention is to provide a planimeter which is durable, is simple in construction and which can be made at much less cost than the instruments of this character now obtainable.

A further object of the invention is to provide a planimeter in which the number of parts is lessened, disarrangement of the assembled parts is avoided, liability of inaccuracies resulting therefrom is avoided and prevented.

A still further object of the invention is in the novel combination and arrangement of the parts as is more fully pointed out in the specification and appended claims.

Figure 3:
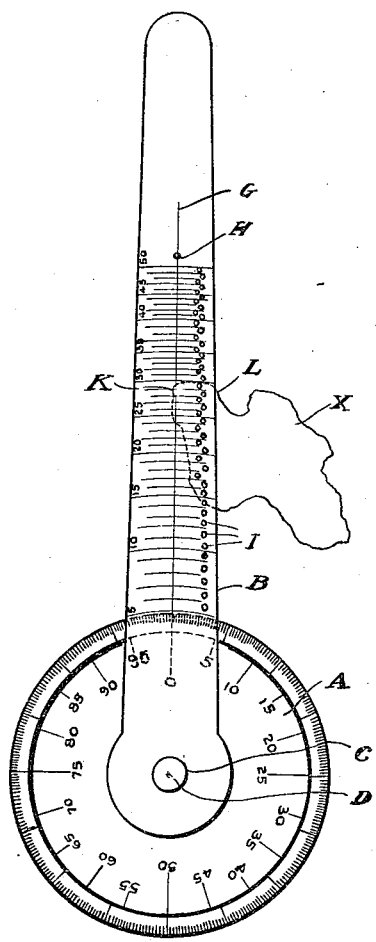
Figure 4:
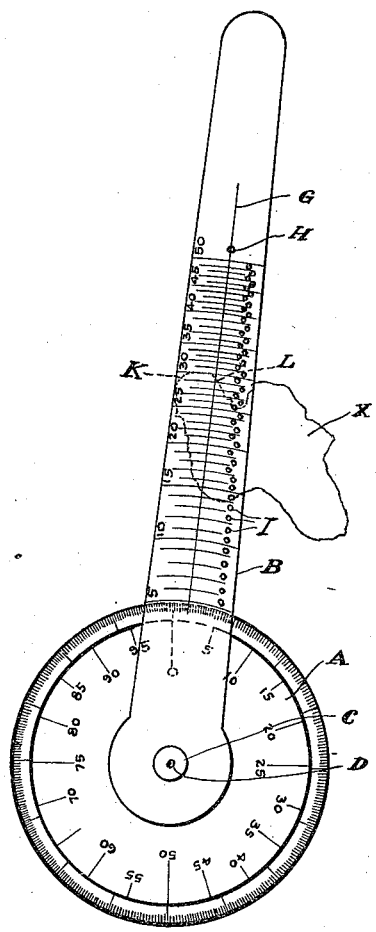
Figure 5:
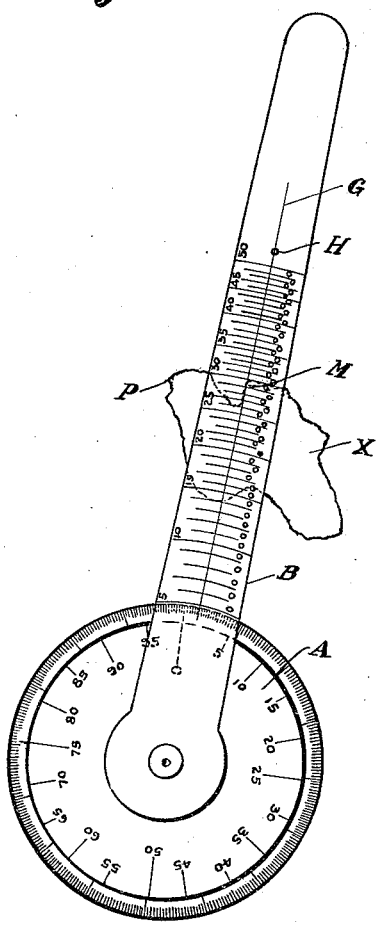
Figure 6:
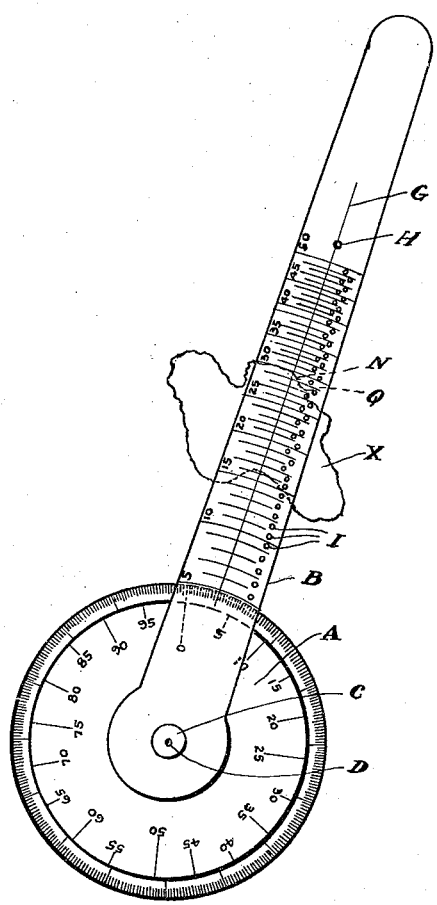

Referring to the drawings, forming part of this specification, Figure 1 is a plan illustrating a combination planimeter and protractor, constructed and arranged in accordance with my invention. Fig. 2 is a longitudinal section of the same, the section being taken on the line II—II of Fig. 1. Fig. 3 is a plan, similar to that shown in Fig. 1, showing the relative position of the planimeter and the drawing of an irregular plane figure at the beginning of the operation of measuring the plotted figure. Fig. 4 is a similar plan, showing the relative position of the planimeter with respect to the plotted figure at the end of the first measuring step. Fig. 5 is a plan, similar to that shown in Figs. 1, 3 and 4, showing the relative positions of the planimeter and figure being measured, at the end of a further step in the measuring operation. Fig. 6 is a plan like that of Figs. 4 and 5, showing, relatively, the positions of the planimeter and the figure at the end of a still further step in the measuring operation. Fig. 7 is a plan showing a modified form of arm adapted for use on the instrument.

In the accompanying drawings the letter A designates a disk which is opaque or transparent and which may be made of celluloid or a similar material. An arm B, which is transparent and preferably is flexible and which may be conveniently made of celluloid, is pivotably secured at one end thereof, to the center of the disk A by means of a rivet or other suitable fastening C. The rivet is flanged and is provided with a small hole D which extends lengthwise through the rivet to enable the disk and arm to be detachably secured to the drawing or surface upon which the figure to be measured or determined is plotted, while permitting rotation of the disk A and arm B. The disk, at its periphery is scored or marked with a series of equally spaced radial lines E arranged to indicate angles in degress. The number of sub-division will depend largely upon the diameter of the disk, so that when of sufficient size 360 degrees and also minutes or fractional parts of a degree may readily be indicated thereon.

The arm B is provided with a medial line G scored on the surface thereof and a small opening or hole H is formed in the arm to intersect the radial line, this hole being provided for convenience in measuring angles when using the instrument as a protractor. Also scored upon the surface of the pivoted arms B so as to intersect the medial line G is a series of short concentric curved lines marked 5, 10, 15, 20, etc., the outer one of these lines being marked 50, and between each of the marked lines are four similar shorter and unmarked lines, dividing the distance between the marked lines into five spaces. Along one edge of the arm between each of the curved lines a small hole I, is formed, which extends through the arm B for a purpose explained later. The lines 5, 10 etc., need not necessarily be curved, but may be straight or may be replaced by a series of dots or points when desired.

The unit of measurement employed in making the instrument illustrated is a square inch although any other unit of measurement may be used. In constructing the measuring instrument or planimeter the line or mark 5 is struck from the axial center D of the arm B at a distance so that the intersection of this mark with the medial line on the arm is the same as the radius of a circle having an area of exactly 5 square inches. The next or 6th line intersects the radial line at a distance from the axial center, of the radius of a circle having an area of exactly 6 square inches. It will be seen in this way the area of the annulus formed by circles of the radii of the lines 5 and 6 will have an area of exactly 1 square inch. Each line, successively from the inner line 5 outward to the outer line 50, is spaced from the next adjacent line at a distance equaling the radius of a circle having an area of 1 square inch more than that of the preceding line, so that the outer line 50, in the instrument illustrated forms the radius of a circle having an area of exactly 50 square inches.

While the unit of measurement used in describing my improved apparatus is the square inch, obviously the apparatus may be scored or marked to employ the metric system or any other desired system.

In the drawings, an irregular figure $x$ is shown, and the operation of the instrument in measuring the area of this plotted figure will now be described.

In using my improved planimeter, the instrument is first placed over the plotted figure $x$, whose area is to be determined, with the medial line G located at one extreme of the plotted figure, and with some one of the curved lines 5, 10, etc., or intermediate lines on the arm G on a line intersecting the extreme upper end or limit of the plotted figure of as shown in Fig. 3. After the planimeter is so positioned, a pin or other sharp pointed instrument is inserted in the axial opening D of the rivet C, which is the pivotal center M of the arm B, to pivotally secure the arm and disk A to the surface on which the figure X is plotted, while permitting the disk, and also the arm B, to be rotated or turned about the pivotal center or pivot pin in the hole D.

The arm B is swung or moved until the medial line G thereon, intersects with the left hand side or the extreme point on the left hand side of the plotted figure, which as shown in Fig. 3 will be between the curved lines 29 and 30. The disk A is then turned relatively to the arm B until the graduation marked O thereon coincides with the medial line G. The disk A is then held against rotation, while the arm B is moved angularly relatively to the disk A from left to right until the portion of the radial line G between the curved graduations 29 and 30 on the arm B traverses the outline of the plotted figure and is in the position shown in Fig. 4. This movement of the arm B measures the portion of the plotted figure bounded by the curved lines 29 and 30, and the points K and L of the figure X, the area of the measured portion being indicated on the disk A and as will be seen equals about one-half of 5/100 of a square inch. As the irregular contour of the figure is such that the portion of the medial line G between the lines 29 and 30 will, with further movement, be moved outside the plotted figure, the disk A is now released to permit it to rotate with the radial arm B, while the arm is being turned to the position shown in Fig. 5, in which the radial line between the curved lines 29 and 30 intersects the point M of the plotted figure X. The disk A is then again held to prevent rotation thereof while the arm B is moved with respect to the plotted figure X from left to right from the point M until in the position shown in Fig. 6. In this position the part of the radial line between the curved lines 29 and 30 is at the point, where it is about to move beyond the point N on the plotted figure and outside of the figure. When in this position, the radial line G on the arm registers with the mark 5 inside of the radial line on the disk A, which indicates one-twentieth of a circle or with the graduations shown 5/100 of 1 square inch.

While the above described operations are being performed, a pencil or other sharp instrument is held in the small opening I located on the arm B between the curved lines 29 and 30 so as to indicate to the operator the portion of the plotted figure X being measured. After the radial arm has been moved with respect to the plotted figure X from the position shown in Fig. 3, into that shown in Fig. 6, in the manner as has been described the sharp instrument is transferred from the hole I between the lines 29 and 30, into the one between the lines 28 and 29. The disk A and arm B are then moved together from right to left until the medial line G on the arm again coincides with the extreme point P on the left of the plotted figure X at a point on the medial line between the curved lines 28 and 29.

Care is taken in moving the arm and disk backwardly or from right to left into this position to prevent relative movement of the disk A and arm B, in order that the measured portion of the plotted figure then indicated by the position of the arm on the disk is not rendered inaccurate.

The flanges on the rivet will frictionally engage the disk and arm so as to ordinarily cause the arm and disk to move together. The disk A is then again held against rotation and the arm is again moved from left to right until the portion of the medial line G between the curved lines 28 and 29 coincides with the line Q of the plotted figure.

When irregularities in the outline of the plotted figure require, the disk A will be released to permit it to move with the arm B until the medial line on the arm between the lines 28 and 29 again crosses the outline of the figure. The arm B then moved relatively to the disk A until the line G between the curved lines 28 and 29 crosses the line outlining the figure on the right of the figure shown in the drawings. By this series movements, the medial arm A will have moved further with respect to the point O on the disk, to record the area of a further portion of the total area of the figure being measured. The pencil or other pointed instrument employed is then moved into the hole between the lines 27 and 28 on the arm to indicate the portion of the figure next to be measured. The arm and the disk are then shifted from right to left without relative movement, as has been described, until the line G, at a point between the curved lines 27 and 28 on the arm, crosses the line defining the plotted figure at the extreme left of the figure. The steps as described are then repeated as often as is required in order to compass the entire plotted figure, the operator successively moving the pencil or other instrument into the next hole I of the series of holes between the curved lines on the arm and taking care to always move the arm relatively to the disk when measuring a portion of the figure and to cause the arm and disk to move in unison at all other times.

The area of plotted figures larger than the planimeter in size may be measured by first sub-dividing the figure into parts of a size capable of being measured by the instrument and by placing the planimeter with respect to one portion of such figure and measuring the area of such portion of the figure and separately measuring each of the other portions of the figure, the total of the successive measuring operations indicating the total area of the entire figure.

In using the instrument for indicating angles, the axial center of the arm is positioned at the intersection of the lines marking the angle to be measured and the arm is turned until the line G is in alinement with one line of the angle to be measured. The arm B is then held while the disk A is turned until the O point on the outside series of graduations of the disk, intersects with the radial line G on the arm. The disk is then held against rotation while the arm B is turned until the radial line on the arm intersects with the other line of the angle. The angle measured will then be indicated in degrees and parts of a degree by the position of the radial line on the arm with respect to the outer series of graduations on the disk A.

The advantages of my invention will be apparent to those skilled in the art. The device is simple, can be made and sold for much less than the ordinary type of planimeter, is easily operated, and by its use plotted areas of any size and cross section may be accurately determined.

By graduating the disk of the planimeter a cheap and inexpensive protractor is provided and a new function is added thereby to the instrument.

Modifications in the construction and in the size of the device may be made without departing from my invention as defined in the appended claims. The arm may be constructed as shown in Fig. 7 with one edge thereof in line with the pivotal center of the arm and in this way avoid the necessity of scoring the medial line thereon. The intersecting lines on the arm may be replaced by dots or other marks and other changes may be made.

I claim:

1. A planimeter comprising a graduated disk and a graduated arm pivoted on the disk, the graduations on the arm being spaced to correspond to the difference of the radii of annuli of equal area.

2. A planimeter comprising a graduated disk and a graduated arm pivoted on the disk, the graduations on the arm being spaced to correspond to the difference of the radii of annuli of equal area and having an opening through the axial center of the disk and arm.

3. A planimeter comprising a graduated disk and a graduated arm formed of transparent material, said arm being pivoted on the disk and the graduations being spaced thereon to correspond to the difference of the radii of annuli of equal area.

4. A planimeter comprising a graduated disk formed of transparent material, and a transparent arm pivoted on the disk, said arm having graduations thereon spaced to correspond to the difference of the radii of annuli of equal area.

5. A planimeter comprising a disk having a series of radial lines thereon forming a series of graduations, and an arm pivotally secured to the disk, said arm having a medial line and a series of intersecting lines thereon, said intersecting lines being spaced on the arm to correspond to the difference of the radii of annuli of equal area.

6. A planimeter comprising a first member having a series of graduations thereon, a second member having graduations thereon and forming a center around which the first member is rotated, and graduations being spaced on said first member to correspond to the difference of the radii of annuli of equal area.

In testimony whereof, I have hereunto set my hand.

LOUIS A. HAWTHORNE.

Witnesses:
 H. F. FLOHN,
 JOHN J. SWINBANK.